United States Patent [19]
De Filippo

[11] Patent Number: 6,056,364
[45] Date of Patent: May 2, 2000

[54] HEADREST FOR MOTOR-VEHICLE SEATS

[75] Inventor: Emilio De Filippo, Bruzolo, Italy

[73] Assignee: Gestind-M.B. "Manifattura di Brusolo" S.p.A., Bruzolo, Italy

[21] Appl. No.: 08/924,999

[22] Filed: Sep. 5, 1997

[30] Foreign Application Priority Data

Jan. 14, 1997 [IT] Italy .................................. TO97A0019

[51] Int. Cl.[7] .................................................. A47C 7/36
[52] U.S. Cl. ........................ 297/410; 248/407; 248/316.3
[58] Field of Search ................... 248/407, 316.3, 248/295.11, 548; 297/410, 216.12; 403/315, 320

[56] References Cited

U.S. PATENT DOCUMENTS

| | | | |
|---|---|---|---|
| 3,979,150 | 9/1976 | Elzenbeck | 297/410 |
| 4,976,493 | 12/1990 | Frankila | 297/410 |
| 4,978,169 | 12/1990 | Shannon et al. | 297/410 |
| 5,199,765 | 4/1993 | Garmendia et al. | 297/391 |
| 5,713,635 | 2/1998 | De Filippo | 297/410 |
| 5,738,413 | 4/1998 | De Filippo | 297/410 |
| 5,775,777 | 7/1998 | Delling | 297/410 |

FOREIGN PATENT DOCUMENTS 152 866  10/1955  Sweden .................................. 297/410

*Primary Examiner*—Peter M. Cuomo
*Assistant Examiner*—Stephen Vu
*Attorney, Agent, or Firm*—Sughrue, Mion, Zinn Macpeak & Seas, PLLC

[57] ABSTRACT

A headrest for motor-vehicle seats comprising a yielding body and a pair of support rods having positioning notches cooperating with respective resilient locking members which can normally be released to enable height adjustment of the headrest. An inertial mass is associated to at least one of the resilient locking members, which is normally kept in an inoperative condition and is movable, upon application to the headrest of a force exceeding a preset threshold value, to an operative condition in which the at least one resilient locking member is made unreleasable relative to the positioning notches of the related support rod.

15 Claims, 5 Drawing Sheets

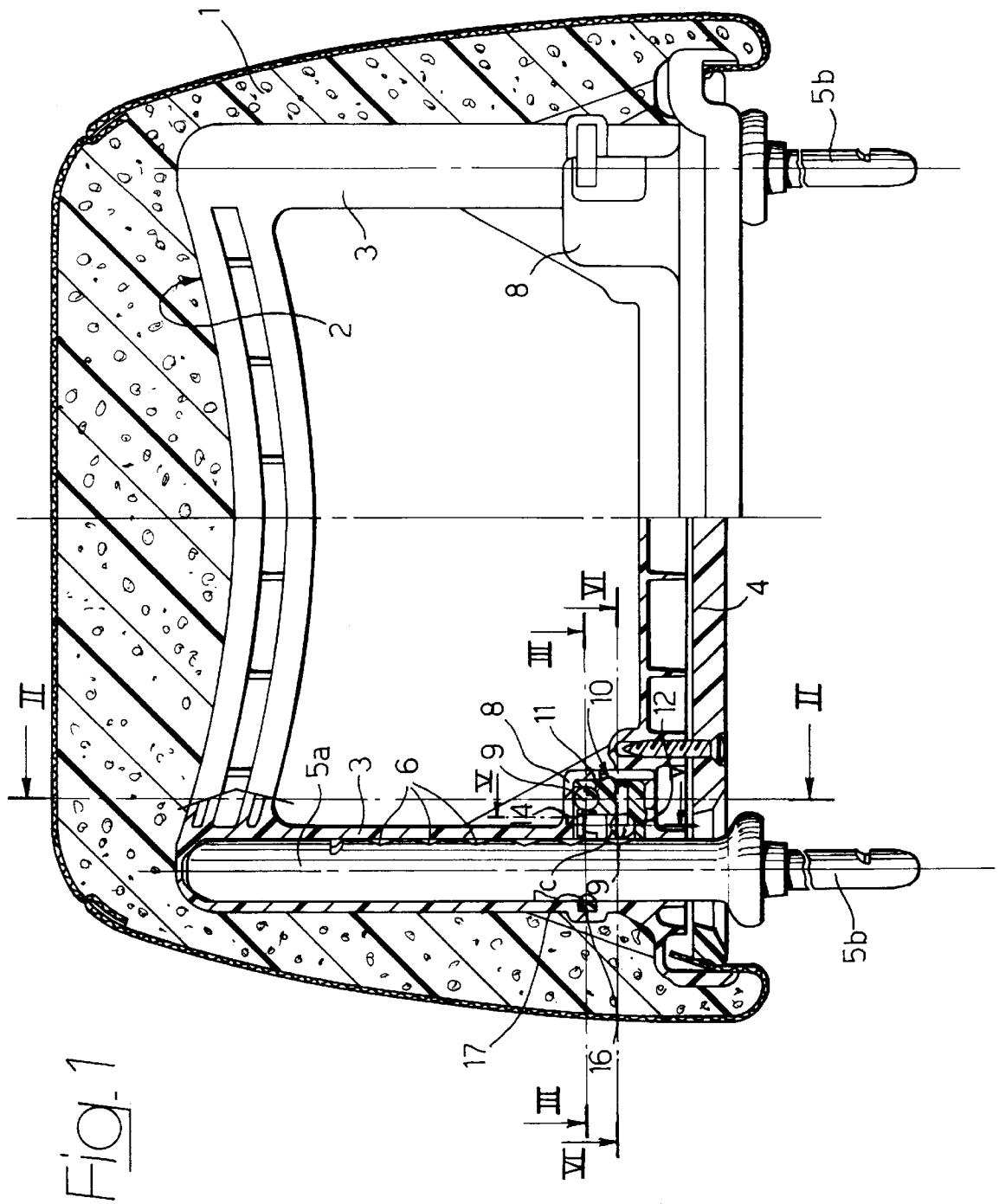

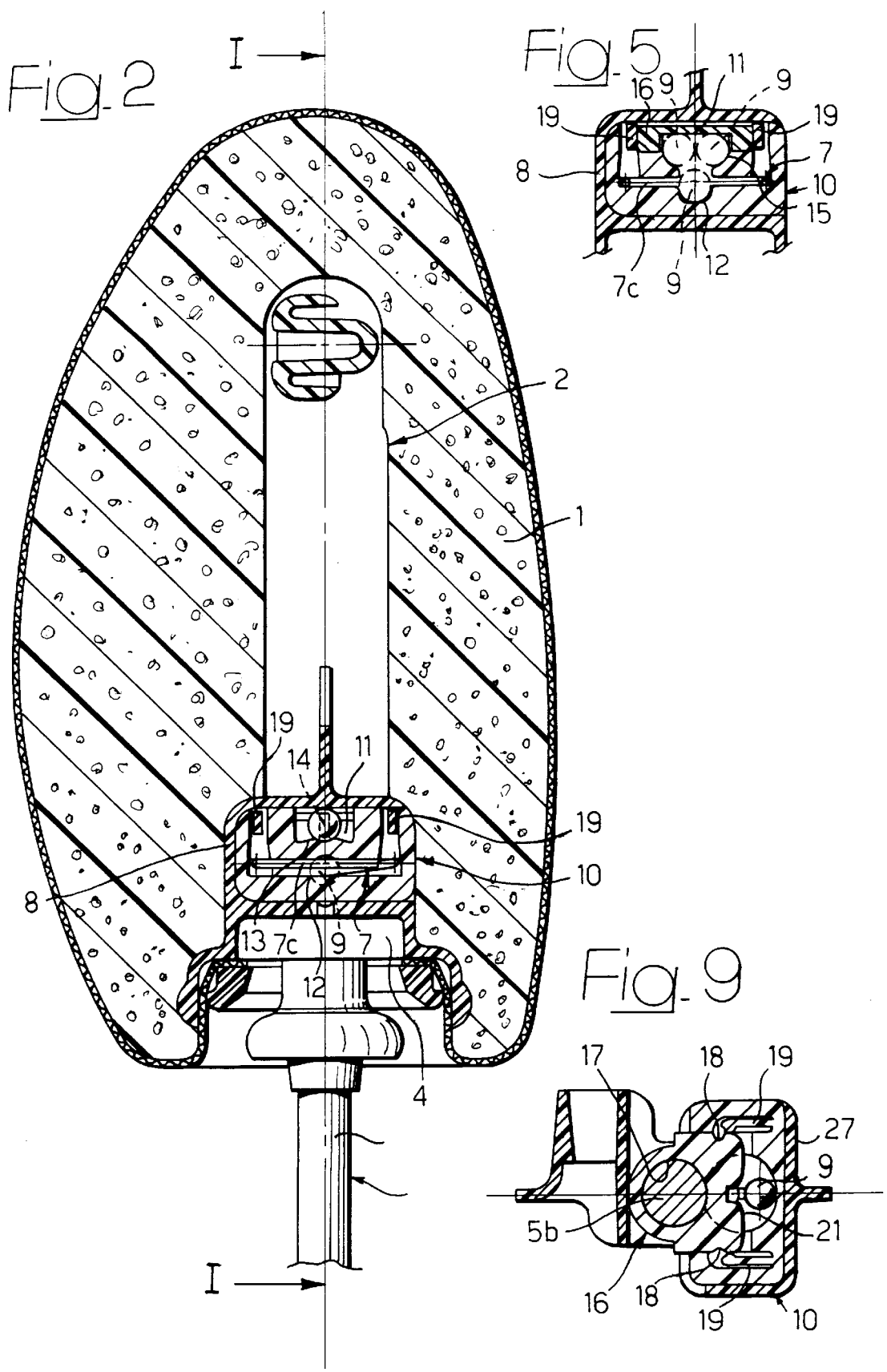

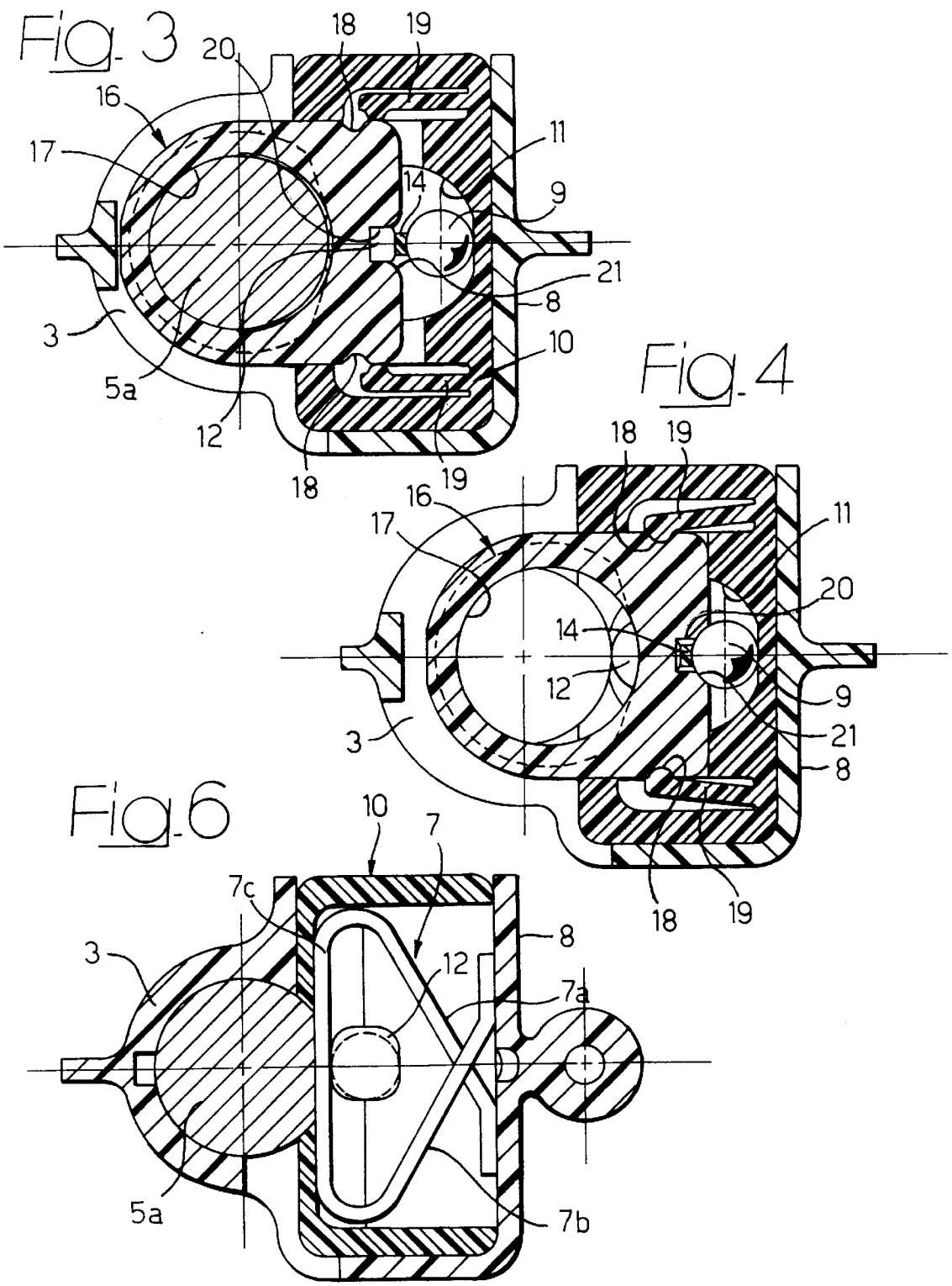

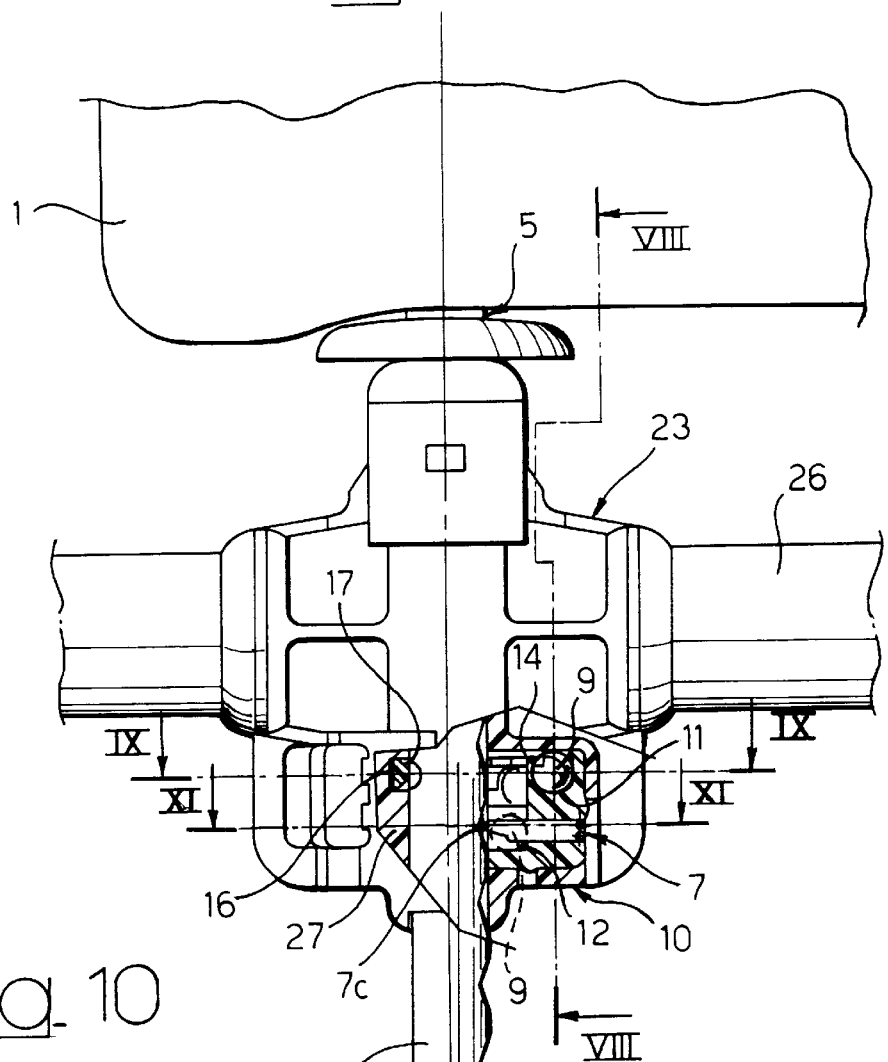
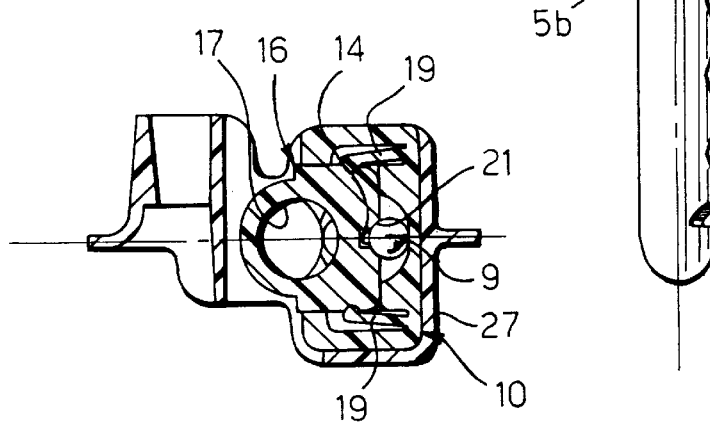

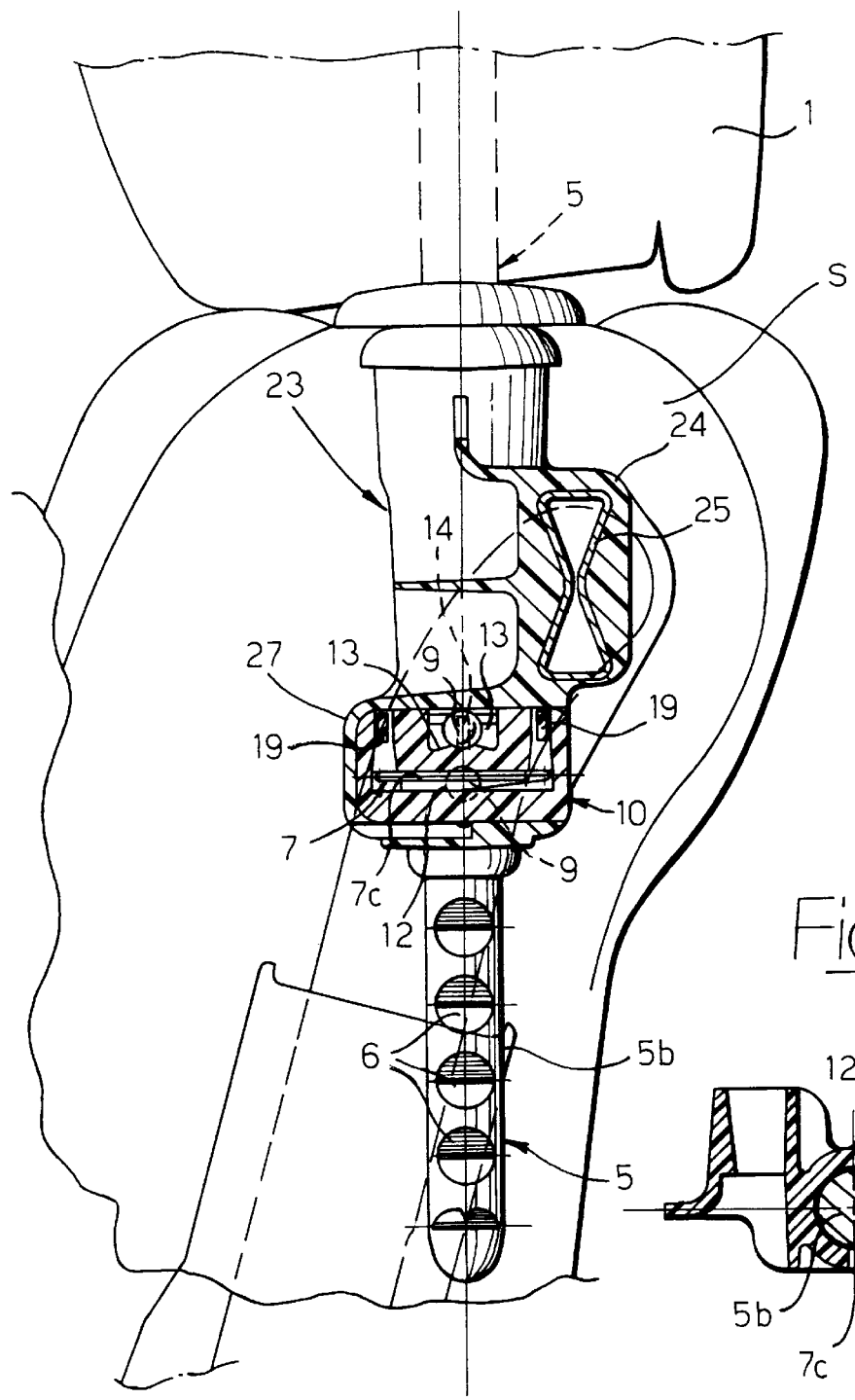
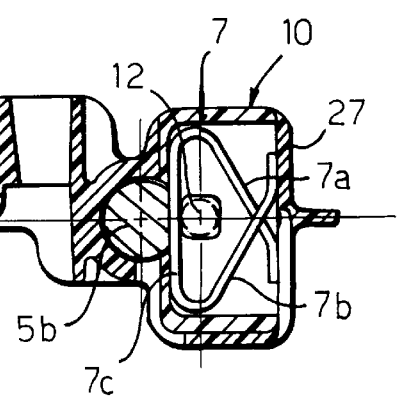

HEADREST FOR MOTOR-VEHICLE SEATS

BACKGROUND OF THE INVENTION

The present invention is related to headrests for motor-vehicle seats comprising a yielding body, a pair of parallel support rods lowerly projecting from the yielding body, and height adjustment means of the yielding body relative to a seat backrest, including a series of positioning notches provided along each of said support rods and respective resilient locking members normally engaging in a disengageable fashion said positioning notches.

Traditionally, height adjustment of the yielding body in headrests of the above-referenced type is performed through provision of two different systems: in a first case the support rods are slidably fitted within respective tubular portions, spaced apart from each other and oriented substantially vertically, of a load bearing framework incorporated within the yielding body, as disclosed for instance in FR-A-2577869 in the name of the same Applicant. In a second case the support rods, rigidly connected to the load bearing framework fitted in the yielding body, are slidable in a substantially vertical direction through a pair of tubular guide elements which in turn are to be rigidly connected to the structure of a seat backrest, as disclosed for instance in EP-A-0582765 and in European Patent Application No. 96830573.0, unpublished at the priority date of the present application, both also in the name of the same Applicant.

In both cases an inconvenience is experienced consisting of that, should the vehicle on board of which the headrest is mounted be subjected to a heavy crash, the yielding body may have a tendency to accidentally displace upwardly, due to spontaneous sliding in the first case of the yielding body itself relative to the support rods, and in the second case of the support rods along the tubular guiding elements. In such event the primary function of the headrest, i.e. reaction afforded by the yielding body against rearward motion of the user's head, is jeopardized. This drawback is particularly critical in connection with short users, and anyway whenever upward displacement of the yielding body in case of crash be such as to produce complete withdrawal thereof from the support rods or, respectively, to produce complete extraction of the support rods from the related tubular guide elements.

SUMMARY OF THE INVENTION

The object of the present invention is to overcome the above drawback, and more particularly to provide a headrest for motor-vehicle seats of the type set forth at the beginning, ensuring safe and firm retainment of the headrest yielding body on the seat backrest of the vehicle on which the headrest is installed, even in case of heavy crash.

In order to achieve this object the present invention provides a headrest of the above-referenced type, the primary feature of which resides in that an inertial mass is associated to at least one of said resilient locking members, said inertial mass being normally kept in an inoperative condition and movable, upon application to the headrest of a force exceeding a preset threshold value at least directed forwardly or rearwardly, to an operative condition in which said at least one resilient locking member is made at least temporarily unrealisable relative to said positioning notches.

In the present specification and in the following claims the terms "vertical", "upper", "lower", "forward", "rearward" and similar are to be intended referred to the mounted condition of the headrest on top of the backrest of a seat installed on board of a motorvehicle, with reference to the longitudinal advancement direction thereof.

According to a preferred embodiment of the invention, said at least one resilient locking member comprises an elastically deformable element in a transverse direction with respect to the support rod and said inertial mass permanently prevents in said operative condition deformation of said elastically deformable element.

The inertial mass is conveniently formed by a rolling member, preferably a ball, housed within a containment body arranged on one side of the support rod and defining, above said elastically deformable element, an upper seat for unstable positioning of the ball in said inoperative condition, a lower seat for stable positioning of the ball in said operative condition, and an intermediate gravity transfer passage of said ball from the upper seat to the lower seat.

For unstable positioning of the ball in the inoperative condition, a resiliently deformable retainer member is normally associated to the upper seat of the containment body, which may be formed by a flexible tooth arranged parallelly to the support rod to clamp the ball against the containment body with a set retaining force.

According to another aspect of the invention, the headrest further comprises a mounting member coupled to the ball containment body and displaceable along a transverse direction with respect to the support rod from an operative position in which it rigidly locks the ball, and an inoperative position in which said ball is solely held by said retainer member.

This mounting member is conveniently formed by a slider having a generally angular shape, slidably guided by said containment body and defining an axial passage for the support rod, displacement of the slider from the operative position to the inoperative position being determined by insertion of the related support rod through said axial passage upon headrest assembling.

Normally the headrest comprises a pair of inertial masses each coupled to the resilient locking member of the respective support rod.

In the case of a headrest of the first above-referenced type, said resilient locking members and the respective inertial masses associated thereto are carried by the tubular portions of the load bearing framework within which the support rods are slidably fitted for height adjustment of the yielding body.

In the case of a headrest of the second above-referenced type, said resilient locking members and the respective inertial masses associated thereto are carried by the tubular guide elements through which the support rods are slidably fitted for height adjustment of the yielding body.

BRIEF DESCRIPTION OF THE DRAWINGS

The invention will now be disclosed in detail with reference to the accompanying drawings, purely provided by way of non limiting example, in which:

FIG. 1 is a diagrammatic and partially vertically sectioned view of a headrest for motor-vehicle seats according to the invention, FIG. 2 is a cross sectioned view along line II—II of FIG. 1, FIG. 3 is a horizontally sectioned and enlarged view along line III—III of FIG. 1, FIG. 4 is a view similar to FIG. 3 but showing a condition prior to assembling the headrest support rods, FIG. 5 is a vertically sectioned view along line V—V of FIG. 1, FIG. 6 is a horizontally sectioned and enlarged view along line VI—VI of FIG. 1, FIG. 7 is a diagrammatic front elevational and partially sectioned view of a second embodiment of the headrest according to the invention, FIG. 8 is a vertically sectioned view along line VIII—VIII of FIG. 7, FIG. 9 is a horizontally sectioned view along line IX—IX of FIG. 7, FIG. 10 is a view similar to FIG. 9 showing a condition prior to assembling the headrest support rods, and FIG. 11 is horizontally sectioned view along line IX—IX of FIG. 7.

DETAILED DESCRIPTION OF THE INVENTION

FIGS. 1 through 6 show a first embodiment of the invention related to a headrest of the first type mentioned at the beginning. With reference to these figures, the headrest essentially comprises a yielding body or cushion 1 normally made of a foamed plastic material, incorporating a load bearing framework 2 made of a relatively rigid moulded plastic material and having a pair of spaced-apart tubular portions 3, oriented substantially vertically and opening at the base 4 of the headrest.

Reference numerals 5 designate two support rods each of which has an upper portion 5a slidably fitted within a corresponding tubular portion 3 of the load bearing framework 2, and a lower portion 5b intended to be rigidly anchored in a conventional way to the structure of the backrest (not shown) of a motor-vehicle seat.

The upper portion 5a of each support rod 5 is provided with a series of positioning notches 6 cooperating with a respective normally disengageable resilient locking member 7 arranged in proximity of the lower area of the corresponding tubular portion 3. Accordingly, the height of the resilient body 1 of the headrest can be adjusted with respect to the top of the seat backrest, by means of a stepped frictioned displacement of the tubular portions 3 of the load bearing framework 2 along the upper portions 5a of the support rod 5.

It is to be pointed out that the positioning notches 6 may conveniently be formed on a plastic material sleeve moulded over a metal core of the upper portion 5a of each support rod 5.

To the aim of preventing accidental upwardly displacement of the resilient body 1 along the support rods 5 (and possibly even complete withdrawal thereof) in case of a crash of the vehicle on which the headrest is installed, the invention provides an inertial mass safety system embodied in the load bearing framework 2 to permanently lock relative sliding between the tubular portions 3 thereof and the upper portions 5a of the respective support rods 5. This inertial mass safety system is preferably (however not necessarily) dual, i.e. it is operatively associated to both support rods 5. Therefore, the following description referred to the left support rod 5 with reference to FIG. 1 can be identically applied also to the right support rod 5.

As shown in detail in FIG. 6, the resilient locking member 7 is formed by a wire spring (made of metal or of plastic material) arranged within an integral lower housing 8 of the tubular portion 3 and having two mutually crossing reaction branches 7a, 7b interconnected by an intermediate branch 7c which is resilienty deformable in a transverse direction with respect to the support rod 5. The branch 7c is engaging, normally in a disengageable fashion, one of the positioning notches 6, and can be disengaged therefrom by virtue of a thrust applied to the yielding body 1 upwardly or downwardly, so as to perform height adjustment thereof. The inertial mass safety system which shall now be disclosed enables preventing elastic deformation of the intermediate branch 7c, i.e. making it irreversibly non disengageable from the positioning notch 6 within which it is engaged.

The inertial mass of the safety system is formed by a rolling member and more preferably, as in the case of the shown example, by a ball 9 housed within a containment body 10 which is arranged, on one side of the support rod 5, within the lower housing 8 of the tubular portion 3. The containment body 10, which as shown in detail in FIGS. 5 and 6 also houses in its lower part the resilient locking member 7, has a generally cup-like shape and may also be possibly formed integrally by moulding with the load bearing framework 2. This containment body 10 defines an upper seat 11 arranged above the resilient locking member 7 and providing unstable positioning of the ball 9 in an inoperative condition shown with full line in the drawings, and a lower seat 12 placed immediately below and in correspondence of the center portion of the intermediate branch 7c of the resilient locking member 7, for stable positioning of the ball 9 in an operative condition, shown with dotted lines in the drawings. The upper seat 11 is delimited lowerly by a substantially saddle roof-like bearing member 13 (FIG. 2), and frontally by a flexible tooth 14 arranged parallely to the support rod 5 and whose function is to clamp the ball 9, in the above mentioned inoperative condition, against the containment body 10 under a set retaining force. For instance, the flexible tooth 14 shall be able to release the ball 9 whenever same is subjected to a forwardly or rearwardly acceleration of about 20 g.

The lower seat 12 of the containment member 10 has a substantially semi-spherical shape, and is communicating with the upper seat 11 through an intermediate substantially funnel-like passage 15 through which, when coming down from the inoperative condition to the operative condition, the ball 9 released by the flexible tooth 14 rolls under gravity from the upper seat 11 to the lower seat 12.

In the drawings, as pointed out the ball 9 is shown by full line in its inoperative condition, while its operative condition is depicted in dotted lines. In FIG. 5, the dotted lines also show the ball 9 in either one of two possible positions taken thereby within the intermediate passage 15 when released by the flexible tooth 14, before reaching the lower seat 12.

Reference numeral 16 designated a mounting member formed by a generally angularly shaped slider slidably coupled with the containment body 10, in the upper area thereof, in a transfer direction with respect to the support rod 5. The mounting member 16 defines an axial passage 17, whose shape is complementary to the cross section of the support rod 5, and is formed with a pair of outer lateral recesses 18 for releasable coupling with a pair of retaining springing inner arms 19 integrally formed with the containment body 10. Moreover the mounting member 16 has a central front recess 20 whose shape is complementary to that of the flexible tooth 14, opening into a front seat 21.

The function of the mounting member 16 is to prevent, prior to assembling of the headrest, any accidental displacement of the ball 9 from the inoperative condition of the operative condition. FIG. 4 shows the mounting member 16 in a temporary operative position, in which this member is fitted within the containment body 10, with the lateral recesses 18 engaged by the springing arm 19. In this position the axis of the axial passage 17 is offset relative to the axis of the tubular portion 3, the recess 20 houses therein the flexible tooth 24 so as to prevent deflection thereof, and the front seat 21 engages the ball 9, so as to prevent any displacement thereof. Accordingly, the yielding body 1 with the load bearing framework 2 embodied therein can be handled without any need of particular caution, in view of following assembling thereof with the support rods 5.

When the upper portion 5a of the support rod 5 is fitted into the respective tubular portion 3 of the load bearing framework 2, it engages the axial passage 17 thus causing extraction of the mounting member 16 relative to the containment body 10, following disengagement between the springing arms 19 and the lateral recesses 18. The mounting member 16 is thus shifted until the axis of the axial passage 17 is centered with the axis of the tubular portion 3, i.e. of the support rod 5, such as shown in FIG. 3. Due to this displacement, the front seat 21 moves away from the ball 9, which is then kept in its inoperative condition solely by the flexible tooth 14, which in turn is now disengaged from the recess 20. Return of the mounting member 16 to its operative position of FIG. 4 is no longer possible owing to the presence of the support rod 5 through the axial passage 17.

In use of the headrest, in normal conditions the ball 9 is held in its inoperative condition, and height adjustment of the headrest relative to the backrest of a motor-vehicle seat can be performed in a usual way by raising or lowering the yielding body 1 along the support rods 5. Elastic deformation of the intermediate branch 7c of the resilient locking member 7 thus enables, by virtue of engagement and disengagement thereof relative to the positioning notches 6, to carry out a stepped frictioned adjustment of the height position of the yielding body 1.

In case of heavy crash of the vehicle on which the headrest is installed, i.e. whenever the acceleration applied to the ball 9 exceeds a preset threshold value, the flexible tooth 14 allows disengagement of the ball 9 relative to the upper positioning seat 11, and rolling thereof downwardly under gravity, through the intermediate passage 15, up to engagement thereof within the lower positioning seat 12. In this condition, the ball 9 bears against the intermediate branch 7c of the resilient locking member 7, whereby this intermediate branch 7c is no longer allowed to elastically bend thus remaining permanently engaged relative to the corresponding notch 6 of the support rod 5. As a consequence this prevents any possible accidental displacement of the yielding body 1, since sliding of the tubular portion 3 of the load bearing framework 2 relative to the support rod 5 is irreversibly prevented.

It is to be pointed out that the same effect is achieved even in case, during a previous height adjustment of the headrest, the intermediate branch 7c of the resilient locking member 7 has not been properly engaged within one of the notches 6 of the support rod 5. Actually in this case any undesired displacement of the yielding body 1 following a vehicle crash will cause correct engagement of the branch 7c into a corresponding notch 6 and, immediately thereafter, fitting of the ball 9 into the lower seat 12 so as to prevent any further disengagement possibility of the branch 7c relative to the notch 6.

It is also to be pointed out that, according to the above disclosed arrangement, the transition of the ball 9 from the inoperative condition to the operative condition will occur whenever the headrest is subjected to a force, exceeding the preset threshold value, directed forwardly or rearwardly with respect to the longitudinal direction of the vehicle. Naturally expedients may be also contemplated so as to achieve the same effect even with respect of forces directed transversally of the longitudinal direction of the vehicle, i.e. in case of lateral crash.

FIGS. 7 through 11 show an alternative embodiment of the invention, corresponding to a headrest of the second type defined at the beginning, i.e. wherein the upper portions 5a of the support rods 5 are fixedly connected (in a way known per se and thus not shown in detail) to the load bearing framework 2 of the yielding body 1, and in which height adjustment of the headrest is performed by means of a slidable coupling between the lower portions 5b of the support rods 5 and the backrest S of a motor-vehicle seat. In this variant, parts which are identical or similar to those already previously disclosed with reference to FIGS. 1 through 6 are indicated by the same numeral references. Moreover even in this variant, as in the case of the previously disclosed embodiment, the inertial mass safety system can be associated only to one or instead to both support rods 5: accordingly the following description referred to one of these support rods 5 can be identically applied also to the other one.

The lower portion 5b of the support rod 5 is formed with the positioning notches 6 and is slidably fitted through a respective tubular guide element, generally designated as 23, in turn rigidly secured to the framework of the backrest S. The arrangement disclosed with reference to the tubular guide element 23 shown in the drawings identically applies also to the other not shown tubular guide element. The tubular guide element 23 is formed by a plastic material bush moulded, in correspondence of a rear thickened section 24 thereof, over a non-circular cross section portion 25 of a metal bar 26 constituting the upper transverse member of the framework of the backrest S. It is however to be pointed out that this arrangement, though quite advantageous, is purely indicative, since the tubular guide elements 23 may simply be formed by metal sleeves fixed to the metal bar 26 by welding.

The lower portion 5b of the support rod 5 is frictionally slidable through the bush 23 so as to enable height adjustment of the yielding body 1 of the headrest relative to the top of the seat backrest S. To such effect the notches 6 cooperate with the intermediate branch 7c of the resilient locking member 7 fitted within the containment body 10 in turn housed in a lower integral housing 27 of the bush 23. Also in this case the containment body 10 may be integrally formed with the bush 23 by moulding.

The arrangement of the containment body 10 and related upper and lower seats 11 and 12, the intermediate transfer passage 15 and the flexible tooth 14, as well as the design of the resilient locking member 7, of the inertial ball 9 and of the mounting member 16 are identical to those already disclosed with reference to the first embodiment of FIGS. 1 through 6. Evidently in this case the displacement of the mounting member 16 from the operative position of FIG. 10 to the inoperative position of FIG. 9 is performed, upon mounting of the assembled headrest on the seat backrest S, following introduction of the lower portions 5b of the support rods 5 through the respective bushes 23.

Even operation of the variant according to FIGS. 7 through 11 is identical to that of the embodiment of FIGS. 1 through 6: when the ball 9 is held in the raised inoperative condition, the intermediate branch 7c of the resilient locking member 7 is free to bend and thus to disengage from the positioning notches 6, thereby allowing height adjustment of the headrest by virtue of upward or downward displacement of the yielding body 5. The lower portions 5b of the support rods 5 can thus frictionally slide in a stepped way through the bushes 23, until the desired positioning is reached.

Should the headrest in use be subjected to a force directed forwardly or rearwardly exceeding a preset threshold value, for instance in case of a abrupt crash of the vehicle on which the headrest is installed, the inertial ball 9 disengages from the flexible tooth 14, thus rolling downwardly from the upper seat 11 into the lower seat 12, via the intermediate passage 15, then positioning behind the intermediate branch 7c of the resilient locking member 7, thus permanently preventing deformation thereof. Consequently this avoids any possible accidental upward displacement of the yielding body 1, since engagement of intermediate branch 7c within a corresponding positioning notch 6 will irreversibly lock sliding of the support rod 5 relative to the bush 23.

Naturally the details of construction and the embodiments may be widely varied with respect to what has been described and illustrated, without thereby departing from the general scope of the present invention such as defined in the appended main claim. Thus, for example, the resilient locking member 7 may have a different design than the one disclosed in the above, and also the inertial mass 9 might be designed differently than a ball, and be for instance constituted by a roller or the like. Lastly, the mounting member 16 might be suppressed and replaced by functionally equivalent expedients.

What is claimed is:

1. A headrest for a motor-vehicle seat having a backrest, said headrest comprising a yielding body, pair of parallel support rods projecting downwardly from the yielding body, and height adjustment means for adjusting the height of the yielding body relative to said seat backrest, including a series of positioning notches provided along each of said support rods and respective resilient locking members engaging said positioning notches normally in a releasable fashion, and further comprising an inertial mass associated with at least one of said resilient locking members and retaining means for maintaining said inertial mass in an inoperative rest condition in which the inertial mass permits transverse movement of said locking member relative to the respective support rod to allow height adjustment of said yielding body, said retaining means being releasable upon application to the headrest of a force exceeding a preset threshold value at least directed forwardly or rearwardly to enable the inertial means to move to an operative condition in which said at least one resilient locking member is made at least temporarily unreleasable relative to said positioning notches.

2. The headrest according to claim 1, wherein said at least one resilient locking member comprises an elastically deformable element deformable in a transverse direction with respect to the support rod, and in that said inertial mass permanently prevents in said operative condition deformation of said elastically deformable element.

3. The headrest according to claim 2, wherein said inertial mass is a rolling member.

4. The headrest according to claim 3, wherein said rolling member is a ball.

5. The headrest according to claim 4, further comprising a containment body for said ball arranged on one side of the support rod and defining above said elastically deformable element an upper seat for unstable positioning of the ball in said inoperative condition, a lower seat for stable positioning of the ball in said operative condition, and an intermediate gravity transfer passage for said ball from said upper seat to said lower seat.

6. The headrest according to claim 5, wherein said intermediate passage has a substantially funnel-shaped configuration, and said lower seat has a substantially semi-spherical shape.

7. The headrest according to claim 5, wherein a resiliently deformable retainer member for the ball in said inoperative condition is associated to said upper seat.

8. The headrest according to claim 7, wherein said resiliently deformable retainer member is formed by a flexible tooth arranged parallely to the support rod to clamp said ball against said containment body under a set retaining force.

9. The headrest according to claim 7, further comprising a mounting member coupled to said containment body and displaceable along a transverse direction with respect to the support rod from an operative position in which said support rod rigidly locks said ball and an inoperative position in which said ball is solely held by said retainer member.

10. The headrest according to claim 9, wherein said mounting member is formed by a slider having a general angled shape, slidably guided by said containment body and defining an axial passage for the support rod, displacement of said slider from said operative position to said inoperative position being determined by insertion of the related support rod through said axial passage upon assembly of the headrest.

11. The headrest according to claim 10, further comprising disengageable coupling means between said slider and said containment body to firmly hold said slider in said operative position in the absence of the related support rod therethrough.

12. The headrest according to claim 2, wherein said resilient locking member comprises a wire spring and said elastically deformable element is a section of said wire spring.

13. The headrest according to claim 1, comprising a pair of inertial masses coupled to said resilient locking members associated to both said support rods.

14. The headrest according to claim 13, further comprising a load bearing framework embodied within said yielding body and having two spaced-apart tubular portions oriented substantially vertically and through which said support rods are slidably fitted so as to enable height adjustment of said yielding body, wherein said resilient locking members and the inertial masses associated thereto are carried by said tubular portions of the load bearing framework.

15. The headrest according to claim 13, further comprising a pair of tubular guide elements to be rigidly secured to the structure of a seat backrest and through which said support rods are slidable in a substantially vertical direction to enable height adjustment of said yielding body, wherein said resilient locking members and the inertial masses associated thereto are carried by said tubular guide elements.

* * * * *

UNITED STATES PATENT AND TRADEMARK OFFICE
CERTIFICATE OF CORRECTION

PATENT NO. : 6,056,364
DATED : May 2, 2000
INVENTOR(S) : Emilio De FILIPPO

It is certified that error appears in the above-identified patent and that said Letters Patent is hereby corrected as shown below:

On the Title Page, Item [73] Assignee:

please change "GESTIND-M.B. Manifattura di Brusolo Spa" to -- GESTIND-M.B. Manifattura di <u>Bruzolo</u> Spa--.

Signed and Sealed this

Twenty-second Day of May, 2001

*Attest:*

NICHOLAS P. GODICI

*Attesting Officer*   Acting Director of the United States Patent and Trademark Office